United States Patent
Wilden et al.

(10) Patent No.: US 11,473,163 B2
(45) Date of Patent: Oct. 18, 2022

(54) METHOD AND DEVICE FOR HEAT TREATMENT OF A METAL COMPONENT

(71) Applicant: SCHWARTZ GmbH, Simmerath (DE)

(72) Inventors: Frank Wilden, Simmerath (DE); Jörg Winkel, Nideggen-Schmidt (DE); Andreas Reinartz, Monschau (DE)

(73) Assignee: SCHWARTZ GmbH, Simmerath (DE)

( * ) Notice: Subject to any disclaimer, the term of this patent is extended or adjusted under 35 U.S.C. 154(b) by 332 days.

(21) Appl. No.: 16/630,144

(22) PCT Filed: Jun. 26, 2018

(86) PCT No.: PCT/EP2018/067158
§ 371 (c)(1),
(2) Date: Jan. 10, 2020

(87) PCT Pub. No.: WO2019/011650
PCT Pub. Date: Jan. 17, 2019

(65) Prior Publication Data
US 2020/0232061 A1    Jul. 23, 2020

(30) Foreign Application Priority Data

Jul. 13, 2017 (DE) .................. 10 2017 115 755.7

(51) Int. Cl.
| | | |
|---|---|---|
| *C21D 9/46* | (2006.01) | |
| *C21D 1/18* | (2006.01) | |
| *C21D 1/673* | (2006.01) | |
| *B32B 15/01* | (2006.01) | |

(52) U.S. Cl.
CPC ............ *C21D 9/46* (2013.01); *B32B 15/013* (2013.01); *C21D 1/18* (2013.01); *C21D 1/673* (2013.01); *C21D 2221/10* (2013.01)

(58) Field of Classification Search
CPC ........ B32B 15/013; C21D 1/18; C21D 1/673; C21D 2221/00; C21D 2221/10; C21D 9/46; C23C 2/06; C23C 2/28
See application file for complete search history.

(56) References Cited

U.S. PATENT DOCUMENTS

| | | | | |
|---|---|---|---|---|
| 2015/0299817 A1* | 10/2015 | Shimotsu | ............ | C21D 8/0294 |
| | | | | 148/566 |
| 2019/0032164 A1* | 1/2019 | Reinartz | .................. | C21D 1/26 |

FOREIGN PATENT DOCUMENTS

| | | | | |
|---|---|---|---|---|
| CN | 103415630 A | 11/2013 | | |
| CN | 206204351 U | 5/2017 | | |
| DE | 102013010024 A1 * | 12/2014 | ........... | B62D 21/157 |
| DE | 102011053941 | 11/2015 | | |
| DE | 202016104191 | 4/2017 | | |
| DE | 202016104194 | 4/2017 | | |
| DE | 202016104194 U1 * | 6/2017 | ............... | C21D 1/19 |
| DE | 102015113056 | 9/2017 | | |
| WO | WO2011/054575 | 5/2011 | | |
| WO | WO2017/129599 | 8/2017 | | |

OTHER PUBLICATIONS

Chinese Office Action dated Feb. 9, 2021 in CN Application No. 2018800467547.

* cited by examiner

*Primary Examiner* — Jenny R Wu
(74) *Attorney, Agent, or Firm* — Occhiuti & Rohlicek LLP

(57) ABSTRACT

The invention relates to a method and a device for the heat treatment of a metal component. The method comprises at least the following steps:
a) heating the component, in a first furnace,
b) setting a temperature difference between at least a first sub-region and a second sub-region of the component in a first temperature-adjusting station,
c) heating at least the first sub-region or the second sub-region of the component in a second furnace,
d) thermally treating at least a sub-region of the component in a second temperature-adjusting station,
e) at least partly forming and/or cooling the component in a press-hardening tool.

6 Claims, 2 Drawing Sheets

METHOD AND DEVICE FOR HEAT TREATMENT OF A METAL COMPONENT

CROSS-REFERENCE TO RELATED APPLICATIONS

This application is the US National Stage of International Application No. PCT/EP2018/067158, filed on Jun. 26, 2018, which claims the priority of German Application No. 10 2017 115 755.7, filed on Jul. 13, 2017, the contents of all of which are hereby incorporated by reference in their entireties.

BACKGROUND

The invention relates to a method and a device for heat treatment of a metal component. The invention has particular application in the partial hardening of optionally pre-coated components of preferably a high-strength manganese-boron steel.

For the manufacture of safety-relevant vehicle body parts made of sheet steel, it is regularly necessary to harden the steel sheet during or after the forming of the body component. For this purpose, a heat treatment process has been established, which is referred to as "press-hardening." Here, the steel sheet, which is provided regularly in the form of a plate, is first heated in a furnace and then cooled during forming in a press and thereby hardened.

For some years now there has been an effort, by means of a press-hardening body, to provide components of motor vehicles, such as A- and B-pillars, side impact beams in doors, sills, frame parts, bumpers, floor and roof crossmembers, front and rear side members, which have different strengths in sub-regions, allowing the body component to perform partially different functions. For example, the center area of a B-pillar of a vehicle should have high strength to protect the occupants in the event of a side impact. At the same time, the upper and lower end regions of the B-pillar should have a comparatively low strength, in order to be able to absorb deformation energy during a side impact and, secondly, to allow easy connection to other body components during assembly of the B-pillar.

To form such a partially hardened body component, it is necessary for the hardened component to have different material structures or strength properties in the sub-regions. To set different material structures or strength properties after hardening, for example, the steel sheet to be hardened can already be provided with different, interconnected sheet metal sections and/or different material thicknesses and/or partially cooled differently in the press. Alternatively or additionally, it is possible to subject the steel sheet to be hardened before cooling and forming in the press to partially different heat treatment processes.

In addition, the components to be hardened are regularly precoated. It should be taken into account that excessively high forming rates and/or excessive component temperatures can lead to crack formation in the coating or even complete destruction of the coating. Zinc-containing coatings are particularly sensitive in this context.

SUMMARY

On this basis, it is an object of the present invention to at least partially solve the problems described with reference to the prior art. In particular, a method and a device for heat treatment of a metal component are to be specified, which allow the production of a press-hardened component with different strengths in sub-regions and still preserve, for example, the zinc-containing (pre-)coating of the component. In addition, the method and the device should preferably be executable or operable as cost-efficiently as possible with respect to energy costs and/or be able to be realized or produced as cost-efficiently as possible with respect to investment costs. In addition, the method and the device should in particular allow the lowest possible cycle time.

These objects are achieved by the features of the independent claims. Further advantageous embodiments of the solution proposed here are specified in the dependent claims. It should be noted that the features listed individually in the dependent claims can be combined with each other in any technologically meaningful manner and define further embodiments of the invention. In addition, the features specified in the claims are specified and explained in more detail in the description, wherein further preferred embodiments of the invention are shown.

An inventive method for heat treatment of a metal component has at least the following steps:
a) heating the component in a first furnace,
b) setting a temperature difference between at least a first sub-region and a second sub-region of the component in a first temperature-adjusting station,
c) heating at least the first sub-region or the second sub-region of the component in a second furnace,
d) thermally treating at least one sub-region the component in a second temperature-adjusting station,
e) at least partial forming and/or cooling the component in a press-hardening tool.

The indicated sequence of method steps a), b), c), d) and e) results in a regular procedure of the method. Individual or several of the method steps may be performed simultaneously, sequentially and/or at least partially in parallel. The method is preferably carried out with a device presented here. The proposed method is used in particular for producing a press-hardened component, precoated with a zinc-containing coating and preformed, in particular cold (in the manner of a semi-finished product), if necessary. The at least one sub-region thermally treated in method step d) can be identical to the first or second sub-region, between which a temperature difference is set in step b). However, it is also possible in the context of the method to thermally treat other sub-regions in method step d). This is particularly preferred if the component does not have a uniform material thickness and/or is coated at least in sub-regions, since the thermal treatment can be adapted in process steps b) and d) to the geometry of the component and if appropriate, an existing coating can be gently heated. In particular, it is also possible to form sub-regions of different strengths whose geometry is independent of the material thickness in these sub-regions.

The proposed method allows in a particularly advantageous manner the production of a press-hardened component with different strengths in sub-regions in industrial mass production and can nevertheless preserve a zinc-containing (pre-) coating of the component. The different strengths are made possible, in particular, by setting a temperature difference between at least a first sub-region and a second sub-region of the component in the first temperature-adjusting station. The protection of the coating is made possible in particular by the fact that in the second temperature-adjusting station, at least a sub-region of the component is (once again) thermally treated before the press-hardening of the component, for example is cooled.

The metal component is preferably a metal plate, a steel sheet or an at least partially preformed semi-finished product. The metal component is preferably formed with or from a (hardenable) steel, for example a boron (manganese) steel, for example with the denomination 22MnB5. More preferably, the metal component is at least for the most part provided with a (metallic) coating or precoated. The metallic coating may be, for example, a (predominantly) zinc-containing coating or a (predominantly) aluminum and/or silicon-containing coating, in particular a so-called aluminum-silicon (Al/Si) coating.

According to an advantageous embodiment, it is proposed that the component is precoated with a (predominantly) zinc-containing coating. The component is preferably zinc-plated at least on its upper side and/or lower side. Preferred here are coatings having a thickness of 10 micrometers [microns], and more, particularly preferably of more than 20 microns.

In step a), the (entire) component is heated in the first furnace. Preferably, the component in the first furnace is heated homogeneously, uniformly and/or evenly. Further preferably, the component is heated in the first furnace (exclusively) by means of radiant heat, for example with at least one electrically operated heating element (without physically and/or electrically contacting the component), such as a heating loop and/or a heating wire, and/or at least one (gas-heated) radiant tube. Preferably, in step a) the component is heated by means of radiant heat and/or convection by at least 500 K [Kelvin], preferably by at least 700 K or even by at least 800 K. Preferably, the component heated in step a) is heated without contact, in particular without heat-conducting and/or electrical contact to an electrically-operated heating element.

Preferably, in step a), the component is heated to a temperature below the AC3 temperature or even below the AC1 temperature. The AC1 temperature is the temperature at which the microstructure transformation from ferrite to austenite begins when a metal component, in particular a steel component, is heated. The AC3 temperature is the temperature at which the microstructure transformation from ferrite to austenite when heating a metal component, in particular a steel component, ends or is (completely) completed. Alternatively, the component may be heated in step a) to a temperature above the AC3 temperature.

Preferably, the component is moved after step a) and before step b) to a first temperature-adjusting station. For this purpose, a transport device, for example comprising at least a roller table and/or a handling device, in particular an (industrial) robot can be provided. Particularly preferably, the component is moved from the first furnace to the temperature-adjusting station. In particular, the component travels a distance of at least 0.5 m [meter] from the first furnace to the temperature-adjusting station. In this case, the component can be guided in contact with the ambient air or within a protective atmosphere.

In step b), a temperature difference is set between at least a first sub-region and a second sub-region of the component in a first temperature-adjusting station. A plurality of first sub-regions and a plurality of second sub-regions of the component may be provided. Preferably, the setting of the temperature difference takes place in step b) by cooling the first sub-region and/or heating the second sub-region of the component. In step b), partial, active, conductive and/or convective cooling of the first sub-region of the component in the temperature-adjusting station preferably takes place. After step b), the component has partially different (component) temperatures, wherein a temperature difference is set between a first temperature of the first sub-region and a second temperature of the second sub-region of the component. In addition, in step b) several (different) temperature differences between sub-regions of the component can be set. For example, it is possible to set three or more sub-regions in the component with mutually different temperatures.

Preferably, the setting of the temperature difference in step b) takes place such that a (first) temperature of the first sub-region of the component is less than a (second) temperature of the second sub-region of the same component. Furthermore, in step b), preference is given to setting a temperature difference of at least 50 K, preferably of at least 100 K or even of at least 150 K, between the first sub-region and the second sub-region of the component. The first sub-region is usually a sub-region which is more ductile in the finished component or a sub-region which receives a lower strength (compared to the second sub-region). The second sub-region is usually a sub-region which is harder in comparison with the finished component, or a sub-region which receives a higher strength (compared to the first sub-region).

If (active) cooling of the first sub-region is provided in step b), this is preferably convective, particularly preferably by means of at least one nozzle discharging a fluid. For this purpose, the nozzle can be arranged in the first temperature-adjusting station and aligned towards the first sub-region. The fluid may be, for example, a gas or a mixture of at least one gas with at least one further fluid, preferably a gas or a liquid. Preferably, the fluid is air, nitrogen, water or a mixture of at least two thereof. Preferably, the cooling takes place by means of a nozzle array with a plurality of nozzles, each discharging a fluid, wherein particularly preferably the shape of the nozzle array and/or the arrangement of the plurality of nozzles is adapted to the (to be achieved) geometry of the first sub-region of the component.

Preferably, the first sub-region in step b) cools to a temperature below the AC1 temperature. Particularly preferably, the first sub-region is (actively) cooled in step b) to a temperature below the AC1 temperature. Preferably, the first sub-region is cooled in step b) to a temperature below 550° C. [degrees Celsius] (823.15 K), more preferably below 500° C. (773.15 K) or even below 450° C. (723.15 K).

In particular, as an alternative or in addition to (active) cooling of the first sub-region, the setting of the temperature difference between the first sub-region and the second sub-region of the component can (also) take place in that the first sub-region is at least partially thermally insulated, separated, delimited and/or is sealed off. Preferably, the first sub-region (in this case), in particular by means of at least one cover, covering compound, guard and/or partition wall, is thermally at least partially isolated, delimited and/or sealed off from the second sub-region and/or from a heat source, such as an (electric) heating element.

Preferably, in step b) in the first temperature-adjusting station and/or simultaneously or at least partially parallel to (active) cooling or passive cooling or letting cool or isolating the first sub-region of the component, an introduction of heat energy into the second sub-region of the component takes place. Preferably, during step b), the second sub-region of the component is (exclusively) subjected to thermal radiation in the first temperature-adjusting station, which is generated and/or emitted, for example, by at least one electrically operated or heated heating element (in particular arranged in the first temperature-adjusting station, not contacting the component) for example by a heating loop and/or by a heating wire, and/or at least one (gas-heated) radiant tube, arranged in particular in the first temperature-adjusting station.

The introduction of heat energy into the second sub-region of the component can take place in such a way that a temperature decrease of the temperature of the second partial region and/or a cooling speed of the second sub-region during step b) and/or during the presence of the component in the first temperature-adjusting station is at least reduced. This process procedure is particularly advantageous if the component was heated in step a) to a temperature above the AC3 temperature. Alternatively, the introduction of heat energy into the second sub-region of the component in the first temperature-adjusting station can take place such that the second sub-region of the component is (distinctly) heated, in particular by at least about 50 K and/or to a temperature which is above the AC1 temperature, in particular between the AC1 temperature and the AC3 temperature. This process procedure is particularly advantageous if the component was heated in step a) to a temperature below the AC3 temperature or even below the AC1 temperature.

Preferably, the component is moved after step b) and before step c) into a second furnace. Particularly preferably, the component is moved (in this case) from the first temperature-adjusting station into the second furnace. For this purpose, a transport device, for example comprising at least a roller table and/or a handling device, in particular an (industrial) robot can be provided. The component preferably travels a distance of at least 0.5 m from the first temperature-adjusting station to the second furnace. In this case, the component can be guided in contact with the ambient air or within a protective atmosphere. Preferably, the component is moved directly after removal from the first temperature-adjusting station directly into the second furnace.

In step c), at least the first sub-region or the second sub-region of the component is heated in a second furnace. Preferably, in step c), at least the first sub-region of the component is heated in the second furnace, preferably by at least 50 K, particularly preferably by at least 100 K, or even by at least 150 K.

Particularly preferably at least the first sub-region of the component is heated in the second furnace (exclusively) by means of radiant heat, for example at least one electrically operated heating element (not contacting the component), such as a heating loop and/or a heating wire, and/or at least one (gas-heated) radiant tube. Further preferably, in particular simultaneously or at least partially in parallel to the heating of the first sub-region, the second sub-region of the component is heated in the second furnace by at least 50 K, more preferably at least by 70 K or even at least by 100 K, in particular (exclusively) by means of radiant heat. Particularly preferably, the second sub-region of the component is heated in the second furnace to a temperature above the AC1 temperature or even above the AC3 temperature. Alternatively, a temperature decrease of the temperature of the second sub-region and/or a cooling speed of the second sub-region are at least simultaneously reduced during the presence of the component in the second furnace, in particular simultaneously or at least partially in parallel to the heating of the first sub-region.

In other words, in step c) an input of heat energy into the entire component, in particular by means of radiant heat, takes place. For example, for this purpose, the second furnace having a furnace interior (exclusively) heatable by radiant heat, in which interior a preferably (nearly) uniform internal temperature is adjustable or adjusted. The introduction of heat energy into the first sub-region of the component preferably takes place in the second furnace such that the temperature of the first sub-region is increased by at least 50 K, preferably by at least 100 K, particularly preferably by at least 150 K or even by at least 200 K.

The introduction of heat energy into the second sub-region of the component can preferably take place in the second furnace in such a way that a temperature decrease of the temperature of the second sub-region and/or a cooling speed of the second sub-region during the presence of the component in the second furnace, are at least reduced. This process procedure is particularly advantageous if the component was heated in step a) to a temperature above the AC3 temperature. Alternatively, the introduction of heat energy into the second sub-region of the component in the second furnace can take place such that the second sub-region of the component at least (distinctly) heats up, in particular by at least 50 K, more preferably by at least 70 K or even by at least 100 K; and/or is heated to a temperature above the AC1 temperature or even above the AC3 temperature. This process procedure is particularly advantageous if the component was heated in step a) to a temperature below the AC3 temperature or even below the AC1 temperature.

Preferably, the component is moved after step c) and before step d) into a second temperature-adjusting station. Particularly preferably, the component is moved (in this case) from the second furnace into the second temperature-adjusting station. For this purpose, a transport device, for example comprising at least a roller table and/or a handling device, in particular an (industrial) robot can be provided. The component preferably travels a distance of at least 0.5 m from the second furnace to the second temperature-adjusting station. In this case, the component can be guided in contact with the ambient air or within a protective atmosphere. Preferably, the component is moved directly after removal from the second furnace directly into the second temperature-adjusting station.

In step d), a thermal treatment of at least one sub-region of the component takes place in a second temperature-adjusting station. Depending on the configuration of the component and the strength properties to be achieved, the second partial region may be (partially) identical to a first sub-region or first second sub-region. However, it is also possible for the at least one sub-region in step d) to be different from the first or second sub-regions between which a temperature difference has been set in step b). In step d), a thermal treatment of at least the first sub-region or the second sub-region of the component preferably takes place in the second temperature-adjusting station. Particularly preferably, (active) cooling (at least) of a partial region, in particular of the second partial region of the component, takes place in step d). Alternatively or additionally, heating of the first sub-region of the component can take place in step d). Preferably, in step d), the first sub-region and the second sub-region of the component are (actively) cooled. In step d), a partial, active, conductive and/or convective cooling of at least the second partial region of the component preferably takes place in the second temperature-adjusting station.

If (active) cooling of at least one sub-region of the component is provided in step d), this is preferably carried out convectively, particularly preferably by means of at least one nozzle discharging a fluid. For this purpose, the nozzle can be arranged in the second temperature-adjusting station and aligned towards the respective sub-region of the component. The fluid may be, for example, a gas or a mixture of at least one gas with at least one further fluid, preferably a gas or a liquid. Preferably, the fluid is air, nitrogen, water or a mixture of at least two thereof. Preferably, the cooling takes place by means of a nozzle field with a plurality of nozzles, each discharging a fluid, wherein particularly preferably the shape of the nozzle field and/or the arrangement of the plurality of nozzles is adapted to the geometry of the respective sub-region of the component.

Preferably, the second sub-region in step d) cools to a temperature below the AC1 temperature. Particularly preferably, the second sub-region is (actively) cooled in step d) to a temperature below the AC1 temperature. Preferably, the second sub-region is cooled in step d) to a temperature in the range of 500° C. to 600° C., preferably in the range of 520° C. to 560° C. This temperature range is particularly advantageous in order to avoid, as far as possible, crack formation in the (subsequent) press-hardening step e) of any given coating of the component provided.

In particular, in addition to an active cooling of the second sub-region, in step d) a passive cooling or letting cool of the first sub-region of the component takes place in the second temperature-adjusting station. However, it is particularly preferred if in step d) simultaneous or at least partially parallel active cooling of the first sub-region and the second sub-region of the same component takes place in the second temperature-adjusting station, in particular in each case by means of at least one fluid-discharging nozzle. The first sub-region and the second sub-region are preferably cooled (in this case) in step d) to a temperature in the range from 500° C. to 600° C., preferably in the range from 520° C. to 560° C.

Preferably, heat energy is introduced into the first sub-region of the component in the second temperature-adjusting station in step d) and/or simultaneously or at least partially parallel to (active) cooling of the second sub-region of the component. Preferably, during step d), the first sub-region of the component is (exclusively) subjected to thermal radiation in the second temperature-adjusting station, which is generated and/or emitted, for example, by at least one electrically operated or heated heating element (in particular arranged in the second temperature-adjusting station, not contacting the component) for example by a heating loop and/or by a heating wire, and/or by at least one (gas-heated) radiant tube, arranged in particular in the second temperature-adjusting station. The introduction of heat energy into the first sub-region of the component can take place in such a way that a temperature decrease of the temperature of the first sub-region and/or a cooling speed of the first sub-region during step d) and/or during the presence of the component in the second temperature-adjusting station are at least reduced. This is advantageous in particular when the first sub-region has a smaller material thickness than the second sub-region.

According to an advantageous embodiment, it is proposed that the component has at least two sub-regions with mutually different material thicknesses. Here, the first sub-region may have a lower material thickness than the second sub-region of the component. Alternatively, the second sub-region may have a lower material thickness than the first sub-region of the component. The different material thicknesses can be achieved, for example, by providing the component as a so-called "tailor rolled blank" (TRB), "tailor welded blank" (TWB) or "patched metal sheet." A "tailor rolled blank" is produced, for example, by rolling a blank to different thicknesses by a rolling process. A "tailor welded blank" is produced, for example, by the fact that individual segments of different thickness and/or different material properties are assembled to form, for example to thermally join into a plate. A "patched metal sheet" in this context refers to a sheet on which additional sheets are placed.

If at least two sub-regions with mutually different material thicknesses are provided, it is furthermore advantageous if, in step d), the at least two sub-regions are treated differently thermally with mutually different material thicknesses. Preferably, a sub-region which has a lower material thickness than another sub-region is less (strongly) cooled than the other (thicker) sub-region. In this case, a lower cooling speed can be set in the sub-region with comparatively lower material thickness.

Preferably, in step d), the sub-regions having mutually different material thickness are each brought to a temperature in the range from 500° C. to 600° C., preferably in the range from 520° C. to 560° C., in particular cooled (actively or passively). In particular, in addition to an active cooling of a sub-region with a comparatively greater material thickness, in step d) a passive cooling or letting cool of a sub-region with comparatively lower material thickness can take place in the second temperature-adjusting station. However, it is particularly preferred if, in step d), simultaneous or at least partially parallel active cooling of the at least two sub-regions with mutually different material thickness, in particular in each case by means of at least one nozzle discharging a fluid, takes place in the second temperature-adjusting station.

Preferably, in step d), in the second temperature-adjusting station and/or simultaneously or at least partially in parallel to (active) cooling of a sub-region with comparatively greater material thickness, thermal energy is introduced into a sub-region with comparatively lower material thickness. Preferably, during step d), the sub-region with comparatively lower material thickness is (exclusively) subjected to thermal radiation in the second temperature-adjusting station, which is generated and/or emitted, for example, by at least one electrically operated or heated heating element (in particular arranged in the second temperature-adjusting station, not contacting the component) for example by a heating loop and/or a heating wire, and/or by at least one (gas-heated) radiant tube, arranged in particular in the second temperature-adjusting station. The introduction of heat energy into the sub-region with comparatively lower material thickness can take place in such a way that a temperature decrease of the temperature of the sub-region with comparatively lower material thickness and/or a cooling speed of the sub-region with comparatively lower material thickness during step d) and/or during the presence of the component in the second temperature-adjusting station is at least reduced.

According to an advantageous embodiment, it is proposed that in step d) locally different component temperatures are matched to each other. Lower temperature differences in the component at the beginning of the press-hardening can contribute to the reduction of component distortion during press-hardening. Preferably, in step d), the entire component is cooled to a temperature in the range of 500° C. to 600° C., preferably in the range from 520° C. to 560° C., before the component is fed to the press-hardening tool.

According to a further advantageous embodiment, it is proposed that in step d) the first sub-region and the second sub-region of the component be cooled to substantially the same component temperature before the component is supplied to the press-hardening tool. "Essentially the same" in this context means in particular a maximum temperature difference of 100 K, preferably at most 40 K. Preferably, the first sub-region and the second sub-region in step d) are cooled (in this case) to a temperature in the range from 500° C. to 600° C., preferably in the range from 520° C. to 560° C., before the component is fed to the press-hardening tool.

Preferably, the component is moved after step d) and before step e) from the second temperature-adjusting station into the press-hardening tool. Preferably, the movement from the second temperature-adjusting station into the press-hardening tool takes place by means of a transport device, for example comprising at least a roller table and/or a handling device, in particular an (industrial) robot. Particularly preferably, the component covers a distance of at least 0.5 m from the second temperature-adjusting station to the press-hardening tool. In this case, the component can be guided in contact with the ambient air or within a protective atmosphere. Preferably, the component is moved directly into the press-hardening tool immediately after removal from the second temperature-adjusting station.

In step e) an at least partial forming and/or cooling of the component takes place in a press-hardening tool. Preferably, the component is formed and cooled simultaneously or at least partially in parallel in the press-hardening tool. When the component is provided preformed, relatively little deformation or final shaping regularly takes place in the press-hardening tool.

In an alternative preferred method, in step a) a homogeneous heating of the component to a temperature above the AC3 temperature takes place, while in step b) the at least one first sub-region is significantly cooled, preferably up to a cooling stop temperature above the martensitic starting temperature, while the at least one second sub-region is only moderately cooled. Preferably, the at least one second sub-region can be heated in order to prevent or delay the cooling of this second sub-region. After renewed heating in step c), a targeted thermal treatment is carried out in step d), in which by choosing in particular the corresponding sub-regions and the corresponding thermal treatment, in particular cooling, in particular taking into account different material thicknesses, a process control can be achieved in which termination of step d) as homogeneous as possible a temperature of the component exists, so that even in coated components with non-homogeneous material thickness a press-hardening can be carried out in step e) without causing cracking in the corresponding coating. For the rest, reference is made to the statements made above.

According to a further aspect, a device for heat treatment of a metal component is proposed, which comprises at least:
 a heatable first furnace,
 a first temperature-adjusting station, which is provided and adapted to set a temperature difference between at least a first sub-region and a second sub-region of the component,
 a heatable second furnace,
 a second temperature-adjusting station, which is provided and adapted at least to thermally treat a sub-region of the component,
 a press-hardening tool.

The mentioned components of the device are regularly arranged in the following order: first furnace, first temperature-adjusting station, second furnace, second temperature-adjusting station, press-hardening tool, preferably arranged in a straight line one behind the other. Advantageously, the respective components of the device are each arranged separately from one another and/or at a distance from one another.

Preferably, at least the first furnace or the second furnace can be heated by means of radiant heat and/or convection. Moreover, it is preferred that the second furnace is provided and adapted to heat at least the first sub-region of the component by at least 50 K, preferably by at least 100 K, more preferably by at least 150 K or even by at least 200 K.

Further preferably, at least the first furnace or the second furnace is a continuous furnace or a chamber furnace. Preferably, the first furnace is a continuous furnace, in particular a roller hearth furnace. The second furnace is particularly preferably a continuous furnace, in particular a roller hearth furnace, or a chamber furnace, in particular a multilayer furnace with at least two or at least three chambers arranged one above the other.

The second furnace is regularly arranged downstream of the first temperature-adjusting station. Preferably, the second furnace comprises a heated furnace interior, in particular (exclusively) by means of radiant heat, in which preferably a (nearly) uniform internal temperature is settable or set. In particular, when the second furnace is designed as a multi-layer chamber furnace, a plurality of such furnace interior spaces may be present, corresponding to the number of chambers.

(Exclusively) radiation heat sources are preferably arranged in the first furnace and/or in the second furnace. Particularly preferably, at least one electrically operated heating element (not contacting the component), such as at least one electrically operated heating loop and/or at least one electrically operated heating wire is arranged in a furnace interior of the first furnace and/or in a furnace interior of the second furnace. Alternatively or additionally, at least one in particular gas-heated radiant tube can be arranged in the furnace interior of the first furnace and/or the furnace interior of the second furnace. Preferably, a plurality of radiant tube gas burners or radiant tubes are arranged in the furnace interior of the first furnace and/or the furnace interior of the second furnace, into each of which at least one gas burner burns. In this case, it is particularly advantageous if the inner region of the radiant tubes into which the gas burners burn, is atmospherically separated from the furnace interior, so that no combustion gases or exhaust gases can enter the furnace interior and thus influence the furnace atmosphere. Such an arrangement is also referred to as "indirect gas heating."

Preferably, the first temperature-adjusting station is arranged downstream of the first furnace. In the first temperature-adjusting station, at least one nozzle may be arranged or held, which is provided and arranged for discharging a fluid. Preferably, the at least one nozzle is provided and arranged for discharging a fluid for cooling the first sub-region of the component. Thus, a temperature difference between the first sub-region and a second sub-region of the component is particularly advantageously adjustable. Particularly preferably, the at least one nozzle is aligned such that it can discharge the fluid toward the first sub-region of the component. More preferably, a nozzle array is arranged with a plurality of nozzles in the first temperature-adjusting station, wherein the nozzles are each provided and arranged for discharging a fluid. Particularly preferred is a shape of the nozzle array and/or an arrangement of the plurality of nozzles adapted to the geometry (to be achieved) of the first sub-region of the component.

At least one heating device is preferably arranged in the first temperature-adjusting station. Preferably, the heating device is provided and configured to introduce heat energy into the second sub-region of the component. Particularly preferably, the heating device is arranged and/or aligned in the first temperature-adjusting station such that the introduction of thermal energy into the second sub-region of the component can be carried out simultaneously or at least partially in parallel to the cooling of the first sub-region of the component by means of the at least one nozzle. The heating device preferably comprises (exclusively) at least one radiant heat source. Particularly preferably, the at least one radiant heat source is formed with at least one electrically operated heating element (not contacting the component (mechanically and/or electrically)), such as at least one electrically operated heating loop and/or at least one electrically operated heating wire. Alternatively or additionally, at least one gas-heated radiant tube can be provided as radiant heat source.

Preferably, the second temperature-adjusting station is arranged downstream of the second furnace. In the second temperature-adjusting station, at least one nozzle may be arranged or held, which is provided and arranged for discharging a fluid. The at least one nozzle for discharging a fluid for cooling at least one sub-region, in particular the second sub-region of the component and/or at least one sub-region of the component with comparatively greater material thickness, is preferably provided and configured. Particularly preferably, the at least one nozzle is aligned such that it can discharge the fluid at least toward the sub-region, in particular towards the second sub-region of the component and/or at least towards a sub-region of the component with comparatively greater material thickness. More preferably, in the second temperature-adjusting station, a nozzle array is arranged with a plurality of nozzles, wherein the nozzles are each provided and arranged for discharging a fluid. Particularly preferably, a shape of the nozzle array and/or an arrangement of the plurality of nozzles is adapted to the geometry of the sub-region, in particular of the second sub-region of the component and/or a sub-region of the component with comparatively greater material thickness.

At least one heating device is preferably arranged in the second temperature-adjusting station. Preferably, the heating device is provided and configured to introduce thermal energy into the first sub-region of the component and/or into a sub-region of the component with a comparatively lower material thickness. Particularly preferably, the heating device is arranged and/or aligned in the second temperature-adjusting station such that the introduction of heat energy into the first sub-region of the component and/or into a sub-region of the component with comparatively lower material thickness is executable by means of the at least one nozzle simultaneously or at least partially in parallel to the cooling of the sub-region, in particular of the second sub-region of the component and/or a sub-region of the component with comparatively greater material thickness. The heating device preferably comprises (exclusively) at least one radiant heat source. Particularly preferably, the at least one radiant heat source is formed with at least one electrically operated heating element (not contacting the component (mechanically and/or electrically)), such as at least one electrically operated heating loop and/or at least one electrically operated heating wire. Alternatively or additionally, at least one gas-heated radiant tube can be provided as radiant heat source.

According to an advantageous embodiment, it is proposed that the second temperature-adjusting station is provided and set up to set different cooling rates in different sub-regions of the component. For this purpose, at least two nozzles can be arranged in the second temperature-adjusting station, which are operated with different air mass flows from each other. Alternatively or additionally, the at least one heating device can contribute to setting the different cooling rates.

Preferably, the press-hardening tool is arranged downstream of the second temperature-adjusting station. The press-hardening tool is in particular provided and arranged to simultaneously or at least partially in parallel reshape the component and (at least partially) to cool it, in particular to quench it. For this purpose, the press-hardening tool can have at least two shells (for example in the manner of a punch and a die) which can be moved toward one another and/or are at least partially cooled.

The device preferably serves to carry out a method proposed here. According to an advantageous embodiment, it is proposed that the device be provided and set up to exercise a method proposed here.

The details, features and advantageous embodiments discussed in connection with the method can accordingly also occur in the case of the device presented here, and vice-versa. In that regard, reference is made in full to the statements there for a more detailed characterization of the features.

According to a further aspect, a use of a device proposed here for the thermal treatment of a precoated metal component with a coating containing zinc is proposed.

The details, features and advantageous embodiments discussed in connection with the method and/or the device can accordingly also occur with the use presented here and vice-versa. In that regard, reference is made in full to the statements there for a more detailed characterization of the features.

The invention and the technical environment will be explained in more detail with reference to the figures. It should be noted that the invention should not be limited by the embodiments shown. In particular, unless explicitly stated otherwise, it is also possible to extract partial aspects of the facts explained in the figures and to combine them with other components and/or findings from other figures and/or the present description. The figures show schematically:

DESCRIPTION

Figure 1:
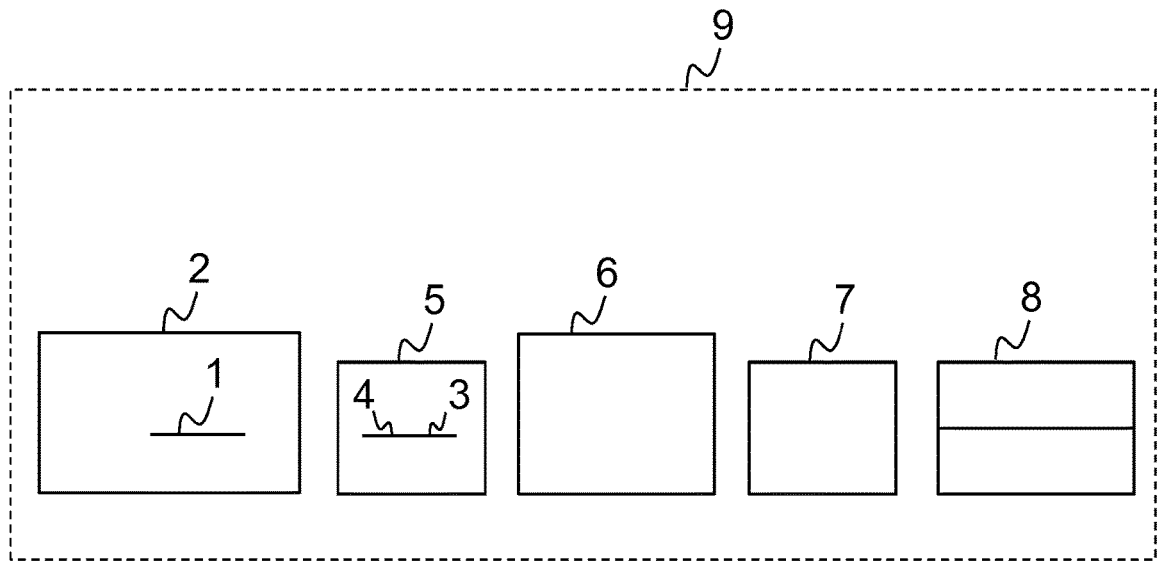
FIG. 1: a diagram of a device according to the invention for the heat treatment of a metal component.

FIG. 1 schematically shows a diagram of a device 9 according to the invention for the heat treatment of a metal component 1. The device 9 has a first furnace 2, a first temperature-adjusting station 5, a second furnace 6, a second temperature-adjusting station 7 and a press-hardening tool 8. The device 9 here represents a hot forming line for press-hardening. The first temperature-adjusting station 5 is (directly) arranged downstream of the first furnace 2 so that a component 1 to be treated by means of the device 9 can be brought directly into the first temperature-adjusting station 5 after leaving the first furnace 2. Furthermore, the second furnace 6 is arranged downstream of the first temperature-adjusting station 5, the second temperature-adjusting station 7 are arranged downstream of the second furnace 6 and the press-hardening tool 8 is arranged (directly) downstream of the second temperature-adjusting station 7. The first temperature-adjusting station 5 is provided and set up to set a temperature difference between at least a first sub-region 3 and a second sub-region 4 of the component 1.

Figure 2:
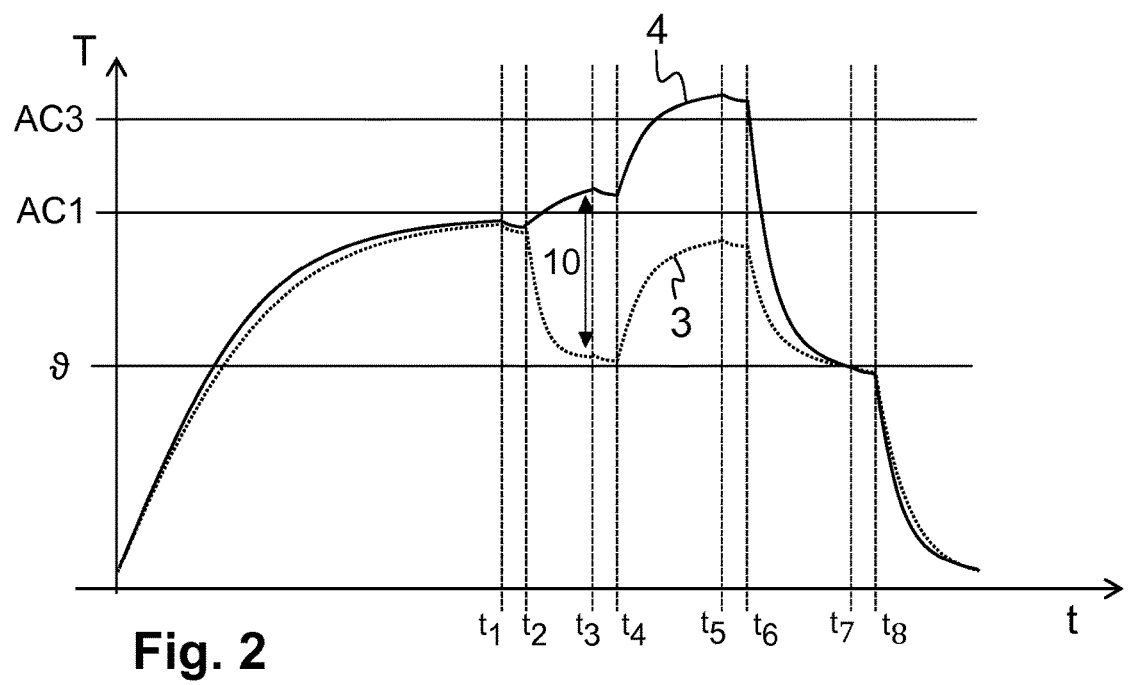
FIG. 2: a temperature-time profile which can be achieved by means of a device according to the invention and/or a method according to the invention.

FIG. 2 shows schematically a temperature-time curve which can be achieved by means of a device 9 according to the invention and/or a method according to the invention. Herein, the temperature T of the metal component or the temperatures T of the first sub-region 3 (dotted line) and the second sub-region 4 (solid line) of the component 1 is plotted over the time t. By way of example, the metal component 1 is precoated with a coating containing zinc, and thus already comprises this before entering the first furnace 2.

Figure 3:
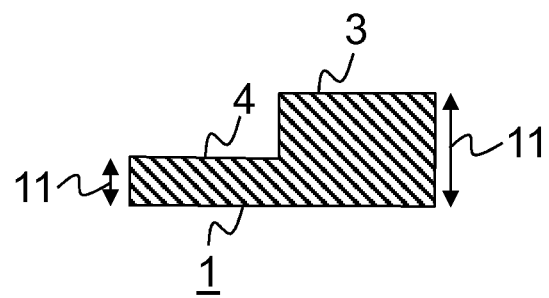
FIG. 3: an example of a component with sub-regions of different material thickness in section.

According to the temperature-time curve shown in FIG. 2, the metal component is heated first, until the time $t_1$ to a uniform temperature below the AC1 temperature. A first sub-region 3 of the component here has, for example, a greater material thickness than a second sub-region 4 of the component (as also shown in FIG. 3), so that the temperature in the second sub-region 4 (solid line) rises faster than in the first partial region 3 (dotted line). This heating takes place in a first furnace. Between the times $t_1$ and $t_2$, the metal component is transferred from the first furnace to a first temperature-adjusting station. Here, the component temperature may slightly decrease, for example, by heat loss to the environment.

Between the times $t_2$ and $t_3$, the first sub-region 3 of the component is (actively) cooled in the first temperature-adjusting station. This is illustrated in FIG. 2 on the basis of the lower, dotted temperature-time profile between the times $t_2$ and $t_3$. In parallel, the second sub-region 4 of the component is (slightly) heated in the first temperature-adjusting station, so that it exceeds the AC1 temperature. This is illustrated in FIG. 2 on the basis of the upper, continuous temperature-time profile between the times $t_2$ and $t_3$. Thus, in the first temperature-adjusting station, a temperature difference 10 is set between the first sub-region 3 and the second sub-region 4 of the component.

Between times $t_3$ and $t_4$, the component is transferred from the first temperature-adjusting station into a second furnace different from the first furnace. Here, the partially different temperatures set in the first temperature-adjusting station, can slightly decrease, for example, by heat loss to the environment.

From time $t_4$ to time $t_5$, the component in the second furnace is heated such that the temperature of the first sub-region 3 of the component is increased by at least 150 K. In addition, the heating in the second furnace is performed such that at the same time the temperature of the second sub-region 4 of the component is brought to a temperature above the AC3 temperature, for example in the range of 870° C. to 910° C.

Between the times $t_5$ and $t_6$, the component is transferred from the second furnace to a second temperature-adjusting station, which differs from the first temperature-adjusting station. Here, the partially different temperatures set in the second furnace, can slightly decrease, for example, by heat loss to the environment.

From the time $t_6$ to the time $t_7$, the first sub-region 3 and the second sub-region 4 of the component is heat treated in the second temperature-adjusting station (differently) in such a way, cooled here, by way of example, (in the manner of pre-cooling), to different degrees that the first sub-region 3 and the second sub-region 4 of the component 1 are cooled to substantially the same component temperature θ before the component is supplied to a press-hardening tool. The component temperature θ is here for example in the range of 520° C. to 560° C. This temperature range is particularly advantageous in order to avoid cracking of the zinc-containing coating of the component as far as possible in the subsequent press-hardening step. In addition, it can advantageously be achieved by moving the sub-regions 3, 4 to the same component temperature that at least a component distortion is reduced during the press-hardening.

Between the times $t_7$ and $t_8$, the component is transferred from the second temperature-adjusting station into the press-hardening tool. In this case, the component temperature set in the second temperature-adjusting station can slightly decrease.

From the time $t_8$ to a process end, quenching of the (entire) component takes place in the press-hardening tool. In this case, an at least partially or even preponderantly martensitic microstructure can be established in the second sub-region 4 of the component which has a comparatively high strength and a comparatively low ductility. Substantially no or only a comparatively small structural transformation has taken place in the first sub-region 3 of the component since the first sub-region 3 of the component has not exceeded the AC3 temperature at any time of the process, so that in the first sub-region 3 of the component a predominantly ferritic microstructure remains, which has a comparatively low strength and a comparatively high ductility.

FIG. 3 shows by way of example a component 1 in section with a first sub-region 3 and a second sub-region 4. In this case, the first sub-region 3 comprises a material thickness 11 which is greater than the material thickness 11 of the second sub-region 4.

A method and device for heat treating a metal component are provided which solve the problems mentioned with reference to the prior art at least partially. In particular, the method and device allow the production of a press-hardened component with different strengths in sub-regions in industrial mass production and can nevertheless conserve a zinc-containing (pre-)coating of the component. In addition, the method and the device are executable or operable as cost-efficiently as possible with respect to energy costs and/or are realized or produced as cost-efficiently as possible with respect to investment costs. In addition, the method and the device allow, in particular, the lowest possible cycle time.

REFERENCE SIGN LIST

1 component
2 first furnace
3 first sub-region
4 second sub-region
5 first temperature-adjusting station
6 second furnace
7 second temperature-adjusting station
8 press-hardening tool
9 device
10 temperature difference
11 material thickness

The invention claimed is:

1. Method for heat treatment of a coated metal component with at least the following steps:
   a. heating the component, in a first furnace,
   b. setting a temperature difference between at least a first sub-region and a second sub-region of the component in a first temperature-adjusting station,
   c. heating at least the first sub-region or the second sub-region of the component in a second furnace,
   d. cooling the component in a second temperature-adjusting station so as to reduce the temperature difference between the first sub-region and the second sub-region of the component,
   e. at least partly forming and/or cooling the component in a press-hardening tool.

2. A method according to claim 1, wherein the component is precoated with a zinc-containing coating.

3. A method according to claim 1, wherein the component comprises at least two sub-regions with mutually different material thickness.

4. A method according to claim 3, wherein in step d) the at least two sub-regions with different material thickness are thermally treated differently from each other.

5. A method according to claim 1 wherein in step d) locally different component temperatures are matched to each other.

6. A method according to claim 1 wherein in step d) the first sub-region and the second sub-region of the component are cooled to substantially the same component temperature before the component is supplied to the press-hardening tool.

\* \* \* \* \*